United States Patent
Keuffer et al.

(10) Patent No.: US 10,461,935 B2
(45) Date of Patent: Oct. 29, 2019

(54) VERIFICATION PROCESS OF AUTHENTICATION OR BIOMETRIC IDENTIFICATION

(71) Applicant: Safran Identity & Security, Issy-les-Moulineaux (FR)

(72) Inventors: Julien Paul Keuffer, Issy les Moulineaux (FR); Herve Chabanne, Issy les Moulineaux (FR); Roch Lescuyer, Issy les Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 358 days.

(21) Appl. No.: 15/582,358

(22) Filed: Apr. 28, 2017

(65) Prior Publication Data
US 2017/0317831 A1 Nov. 2, 2017

(30) Foreign Application Priority Data

Apr. 29, 2016 (FR) ...................................... 16 53890

(51) Int. Cl.
*G06F 7/02* (2006.01)
*G06F 19/00* (2018.01)
(Continued)

(52) U.S. Cl.
CPC ............ *H04L 9/3231* (2013.01); *G06F 21/32* (2013.01); *G06K 9/00885* (2013.01);
(Continued)

(58) Field of Classification Search
CPC . G06F 7/02; G06F 19/00; G06F 21/32; G06F 21/34; G06F 21/83; G06K 9/00
See application file for complete search history.

(56) References Cited

U.S. PATENT DOCUMENTS 9,747,470 B2 * 8/2017 Patey ...................... G06F 21/71
2011/0099385 A1 * 4/2011 Takahashi ........... H04L 63/0861
713/186

OTHER PUBLICATIONS

Bringer, J., et al., "Some Applications of Verifiable Computation to Biometric Verification", 2015 IEEE International Workshop on Information Forensics and Security (WIFS), Nov. 16, 2015, 1-6.
(Continued)

*Primary Examiner* — Jospeh P Hirl
*Assistant Examiner* — Kalish K Bell
(74) *Attorney, Agent, or Firm* — Womble Bond Dickinson (US) LLP

(57) ABSTRACT

The invention proposes a method for processing biometric data, comprising verification of the result of a calculation of distance between a biometric candidate datum and at least one biometric reference datum, each comprising a number n of indexed components ($a_i$, $b_i$), said calculation of distance comprising that of a polynomial of the components of the biometric data,
the method being executed by a proving entity and a verification entity, the method comprising steps during which:
- the proving entity communicates to the verification entity the result of calculation of the distance between the candidate and reference biometric data, and said data,
- the proving entity generates from each datum a function of a number d of variables $f_a(i_1, \ldots, i_d)$, $f_b(i_1, \ldots, i_d)$ where $d = \log_2 n$, defined for each variable on the set $\{0,1\}$, by reformulation of the index i of each component ($a_i$, $b_i$) in binary format,
- the proving entity generates from each function a polynomial of d variables $\tilde{a}(x_1, \ldots x_d)$, $\hat{b}(x_1, \ldots x_d)$ defined on $\mathbb{F}^d$ where $\mathbb{F}$ is a finite field, such that each polynomial $\tilde{a}$, $\hat{b}$ coincides with the corresponding function $f_a, f_b$ on the set $\{0,1\}^d$, and generates from the polyno-
(Continued)

mials ã, b̂ a polynomial $p(x_1, \ldots, x_d)$ of d variables of the same expression as that of the distance between the data, and the proving entity and the verification entity engage in a Sumcheck protocol applied to the polynomial p to verify the result of calculation of the distance between the data.

13 Claims, 2 Drawing Sheets

(51) Int. Cl.
| | |
|---|---|
| *G06F 21/32* | (2013.01) |
| *G06F 21/34* | (2013.01) |
| *G06F 21/83* | (2013.01) |
| *G06K 9/00* | (2006.01) |
| *H04L 9/32* | (2006.01) |
| *H04L 29/06* | (2006.01) |
| *G06Q 20/40* | (2012.01) |

(52) U.S. Cl.
CPC ............ *H04L 63/0861* (2013.01); *G06K 2009/00959* (2013.01); *G06Q 20/40145* (2013.01); *H04L 63/10* (2013.01); *H04L 2463/082* (2013.01)

(56) References Cited

OTHER PUBLICATIONS

Chabanne, H., et al., "Delegating Biometric Authentication with the Sumcheck Protocol", Network and Parallel Computing, Sep. 27, 2016, 236-244.

Safran Identity & Security, "Preliminary Search Report", FR Application No. 1653890, dated Jan. 18, 2017 (with English Translation Cover Sheet).

Safran Identity & Security, "Search Report", EP Application No. 17168942.5, dated May 31, 2017 (with English Translation Cover Sheet).

Thaler, J., "Time-Optimal Interactive Proofs for Circuit Evaluation", Network and Parallel Computing, Aug. 18, 2013, 71-89.

Walfish, M., et al., "Verifying Computations without Reexecuting Them", Communications of the ACM, Association for Computing Machinery, Inc., vol. 58, No. 2, Jan. 28, 2015, 74-87.

\* cited by examiner

VERIFICATION PROCESS OF AUTHENTICATION OR BIOMETRIC IDENTIFICATION

FIELD OF THE INVENTION

The invention relates to a method for processing biometric data, comprising verification of the result of a calculation of distance involving calculation of a polynomial of the components of the data, between a biometric candidate datum and at least one biometric reference datum.

The invention applies especially to verification of authentication or biometric identification performed by a device personal to an individual and not by a trustworthy processing unit such as a governmental processing unit.

In this respect, the invention applies advantageously to verification of calculation of distances comprising calculation of a scalar product, specifically distances of Euclidian distance or Hamming distance type.

PRIOR ART

Systems for identification or authentication are already known where a user presents to a trustworthy processing unit, for example a unit belonging to customs, a biometric datum which the unit confronts with one or more biometric reference data recorded either in an identity document of the user or in a database to which he has access.

The advantage of this scenario is that the result of the comparison between the biometric data is considered reliable since the comparison is conducted by a trusted unit. But the identification or authentication step, comprising acquisition of a fresh biometric datum on the user, can last for a long time and cause creation of wait files. This is the case for example when passing through customs where authentication against a biometric datum contained in a passport of an individual is carried out.

To avoid this type of disagreement, an alternative scenario could be possible in which the user would be authenticated or identified by means of an electronic device which personal to him, such as a mobile telephone, and would provide the result of this authentication or identification only to the processing unit in charge of control.

In this case however, the problem arises of reliability of the result of authentication or identification, and especially of the result of comparison between the biometric data which enabled the user to be authenticated or identified. It is in fact necessary to propose means so that the processing unit in charge of control can verify that the result is correct and the user has not committed fraud or error in making the comparison of the biometric data.

PRESENTATION OF THE INVENTION

The aim of the invention is to resolve the problem presented hereinabove by proposing a verification method of the result of a comparison between two biometric data.

In particular, an aim of the invention is to allow a user to perform with a personal authentication or biometric identification electronic device, and to enable a verification entity to verify the correctness of the calculation of distance between the biometric data having enabled this authentication or identification.

Another aim of the invention is to enable the user to prove the result of calculation of distance between the biometric data, by means of a personal electronic device of low calculation capacity.

Another aim of the invention is to be applicable to authentication or biometric identification on the basis of the following biometric traits: iris or shape of the face of the individual (facial recognition).

Another aim of the invention, in the case of identification, is to verify the result of the calculation of distance between a biometric candidate datum and a plurality of biometric reference data at the same time.

In this respect, the aim of the invention is a method for processing biometric data, comprising verification of the result of calculation of distance between a biometric candidate datum and at least one biometric reference datum each comprising a number n of indexed components, said calculation of distance comprising that of a polynomial of the components of the biometric data, the method being executed by a proving entity and a verification entity, each entity being a processing unit comprising processing and communication means with the other entity, the method comprising steps during which:

the proving entity communicates to the verification entity the result of calculation of the distance between the candidate and reference biometric data, and said data, the proving entity generates from each datum a function of a number d of variables $f_a(i_1, \ldots, i_d)$, $f_b(i_1, \ldots, i_d)$ where $d = \log_2 n$, defined for each variable on the set $\{0,1\}$, by reformulation of the index i of each component in binary format, the proving entity generates from each function a polynomial of d variables $\tilde{a}(x_1, \ldots x_d), \tilde{b}(x_1, \ldots x_d)$ defined on $\mathbb{F}^d$ where $\mathbb{F}$ is a finite field, such that each polynomial $\tilde{a}, \tilde{b}$ coincides with the corresponding function $f_a, f_b$ on the set $\{0,1\}^d$, and generates from the polynomials $\tilde{a}, \tilde{b}$ a polynomial $p(x_1, \ldots, x_d)$ of d variables of the same expression as that of the distance between the data, and the proving entity and the verification entity (V) engage in a Sumcheck protocol (230) applied to the polynomial p to verify the result of the calculation of the distance between the data.

Advantageously, though optionally, the method according to the invention can also comprise at least one of the following characteristics: calculation of distance comprises that of a scalar product, and the polynomial p comprises at least one term g equal to a scalar product between the polynomials $\tilde{a}$ and $\tilde{b}$:

$$g(x_1, \ldots, x_d) = \tilde{a}(x_1, \ldots, x_d) \cdot \tilde{b}(x_1, \ldots, x_d).$$

the calculated distance is the square of the Euclidian distance, and the polynomial p is written as:

$$p(x_1, \ldots, x_d) = \tilde{a}(x_1, \ldots, x_d) \cdot \tilde{a}(x_1, \ldots, x_d) + \tilde{b}(x_1, \ldots, x_d) \cdot \tilde{b}(x_1, \ldots, x_d) - 2g(x_1, \ldots, x_d).$$

the calculated distance is the Hamming distance, and the polynomial p is written as:

$$p(x_1, \ldots, x_d) = \tilde{a}(x_1, \ldots, x_d) + \tilde{b}(x_1, \ldots, x_d) - 2g(x_1, \ldots, x_d).$$

the biometric candidate datum and the biometric reference datum or the biometric reference data are initially retained by the proving entity, and the method comprises a preliminary masking step, by the proving entity, of the biometric data, said masking comprising random generation of a circular permutation and a vector of n components, and implementing a sum or operation « exclusive or » between each datum permutated by the circular permutation and the randomly generated vector.

each polynomial $\tilde{a}(x_1, \ldots x_d)$ and $\hat{b}(x_1, \ldots x_d)$ is of a degree in each variable.

the polynomial $\tilde{a}(x_1, \ldots x_d)$ is defined by:

$$\forall x \in \mathbb{F}^d, \tilde{a}(x) = \sum_{i=(i_1,\ldots,i_d) \in \{0,1\}^d} a(i) \chi_i(x)$$

with:

$$\chi_v(x_1, \ldots, x_d) = \prod_{k=1}^{d} \chi_{v_k}(x_k)$$

and where the function $\chi_{v_k}(x_k)$ is defined, for $x_{k \in} \{0,1\}$, by:

$$\begin{cases} \chi_{v_k}(x_k) = 1 - x_k & \text{if } v_k = 0 \\ \chi_{v_k}(x_k) = x_k & \text{if } v_k = 1 \end{cases}$$

the application of the Sumcheck protocol comprises a series of iterations for j from 2 to d−1 during which the verification entity randomly generates and communicates to the proving entity a value $r_{j-1}$, and the proving entity generates a polynomial:

$$p_j(X_j) = \sum_{x_{j+1} \in \{0,1\} \ldots x_d \in \{0,1\}} p(r_1, \ldots, r_{j-1}, X_j, x_{j+1}, \ldots, x_d)$$

and, at each iteration, the proving entity has for each polynomial $\tilde{a}$, $\tilde{b}$ a table $A^{(j)}$, $B^{(j)}$ comprising respectively all the possible values of the functions $\tilde{a}(r_1, \ldots r_{j-2}, x_{j-1}, \ldots x_d)$ and $\hat{b}(r_1, \ldots r_{j-2}, x_{j-1}, \ldots x_d)$ for $(x_{j-1}, \ldots x_d) \in \{0,1\}^{d-j+1}$, where each value $r_k$ (k=1, \ldots, j−2) has been generated randomly by the verification entity and sent to the proving entity during the preceding iterations, evaluation of a polynomial $p_j$ in a value t is undertaken by the proving entity from the values t, $r_{j-1}$ and the values of the tables $A^{(j)}$, $B^{(j)}$, and the proving entity increments the tables $A^{(j+1)}$, $B^{(j+1)}$ for the iteration j+1 by replacing their values by all possible values $\tilde{a}(r_1, \ldots r_{j-1}, x_j, \ldots x_d)$ and $\hat{b}(r_1, \ldots r_{j-1}, x_j, \ldots x_d)$ for $(x_j, \ldots x_d) \in \{0,1\}^{d-j}$, the tables being initialised for the polynomial $p_2$ in comprising all the possible values of the polynomials $\tilde{a}$, $\hat{b}$ on the set $\{0,1\}^d$.

The method can comprise verification of the result of calculation of a scalar product between a biometric candidate datum and each of a number m of biometric reference data, in which the biometric reference data are combined in a matrix M of size (n,m) such that the scalar products are obtained by the product of the candidate vector and of the matrix, and, the Sumcheck protocol is executed on a polynomial $p_{(r_1, \ldots, r_d)}(j_1, \ldots, j_d)$ such that:

$$p_{(r_1,\ldots,r_d)}(j_1, \ldots, j_d) = \sum_{j_1,\ldots,j_d \in \{0,1\}^d} \tilde{a}(j_1, \ldots, j_d) \cdot \tilde{M}(j_1, \ldots, j_d, r_1, \ldots, r_d)$$

where $(r_1, \ldots, r_d)$ is a vector whereof the components are generated randomly by the verification entity.

Another aim of the invention is a method of authentication or biometric identification of an individual, comprising:
comparison, by a proving entity, of a biometric datum acquired on a biometric trait of an individual to at least one biometric reference datum by calculation between said data of a distance, and
execution of the method according to the preceding method for verification of the result of the comparison.

Advantageously, though optionally, in the case of authentication, the proving entity is an electronic device personal to the individual of telephone type, personal computer or digital tablet comprising a computer, an image sensor, and an acquisition module of a biometric reference datum contained in an identity document.

According to another aim, the invention relates to a computer program product, comprising code instructions for performing operations of:
acquisition of an image and conversion of said image into a biometric datum comprising n components,
acquisition of a biometric reference datum recorded in an identity document, the datum comprising n components,
comparison of the two data by calculation of a distance between the two data comprising calculation of a polynomial of the components of the data,
communication of the result and of said data to a verification entity,
generation from each component $a_i$, $b_i$ of each datum of a function of a number d of variables $a(i_1, \ldots, i_d)$, $b(i_1, \ldots, i_d)$ where $d = \log_2 n$, defined for each variable on the set $\{0,1\}$, by reformulation of the index i of the component $a_i$, $b_i$ in binary format,
generation, from each function, of a polynomial of d variables $\tilde{a}(x_1, \ldots x_d)$ $\hat{b}(x_1, \ldots x_d)$ defined on a finite field, such that each polynomial $\tilde{a}$, $\hat{b}$ coincides with the corresponding function a,b on the set $\{0,1\}^d$, and
generation, from the polynomials $\tilde{a}$ and $\hat{b}$ of a polynomial p of d variables of the same expression as that of the distance between the data,
engagement, with the verification entity, in a Sumcheck verification protocol applied to the polynomial p.

According to another aim, the invention relates to the application of the Sumcheck protocol to calculation of distance between a biometric candidate datum and at least one biometric reference datum each comprising n components, the calculation of distance comprising that of a polynomial of the components of the data, in which each biometric datum is converted into a multivariate polynomial defined on a finite field by:
reformulation of the index i of each component of each biometric datum in binary format to obtain a function $(f_a, f_b)$ of d variable or $\log_2 n$,
extension of each function $(f_a, f_b)$ in a polynomial $\tilde{a}$, $\hat{b}$ of d variables defined on a finite field, and
generation of a polynomial p from the polynomials $\tilde{a}$ and $\hat{b}$ of same formula as the polynomial of the distance applied to the biometric data.

In an embodiment, the invention relates to a method for processing biometric data, comprising verification of the result of calculation of distance between a biometric candidate datum and at least one biometric reference datum each comprising a number n of indexed components $a_i$, $b_i$,
the method being executed by a proving entity and a verification entity, each entity being a processing unit comprising processing and communication means with the other entity, the method comprises steps during which:
the proving entity communicates to the verification entity the result of the calculation of the distance between the candidate and reference biometric data, and said data,
the proving entity generates from each datum a function of a number d of variables $a(i_1, \ldots, i_d)$, $b(i_1, \ldots, i_d)$ where $d=\log_2 n$, defined for each variable on the set $\{0,1\}$, by reformulation of the index i of the component $a_i$, $b_i$ in binary format,
the proving entity generates from each function a polynomial of d variables $\tilde{a}(x_1, \ldots x_d)$, $\hat{b}(x_1, \ldots x_d)$ defined on a finite field, such that each polynomial $\tilde{a}$, $\hat{b}$ coincides with the corresponding function a,b on the set $\{0,1\}^d$, and generates from the polynomials $\tilde{a}$ and $\hat{b}$ a polynomial p of d variables of the same expression as the distance between the data, and
the proving entity and the verification entity engage in a protocol during which:
during a first step, the proving entity generates a polynomial $p_1$ of a variable such that:

$$p_1(X_1) = \sum_{x_2 \in \{0,1\} \ldots x_d \in \{0,1\}} p(X_1, x_2, \ldots, x_d)$$

and communicates the polynomial $p_1$ to the verification entity which verifies that the sum of the evaluations of the polynomial $p_1$ in 0 and 1 is equal to the result H of the calculation of the distance, and in this case,
for any j from 2 to d−1,
the verification entity randomly generates a value $r_{j-1}$ in the finite field and communicates it to the proving entity,
the proving entity generates a polynomial $p_j$ such that:

$$p_j(X_j) = \sum_{x_{j+1} \in \{0,1\} \ldots x_d \in \{0,1\}} p(r_1, \ldots, r_{j-1}, X_j, x_{j+1}, \ldots, x_d)$$

and communicates to the verification entity the polynomial $p_j$,
the verification entity determines the value of the polynomial $p_{j-1}$ in $r_{j-1}$ and verifies that $p_{j-1}(r_{j-1})=p_j(0)+p_j(1)$, and in the opposite case determines that the result of the calculation of the distance is false, then,
the verification entity randomly generates a value $r_d$ in the finite field,
the proving entity generates a polynomial $p_d$ such that:

$$p_d(X_d)=p(r_1, \ldots, r_{d-1}, X_d)$$

and sends the polynomial $p_d$ to the verification entity,
the verification entity determines $p_d(r_d)$ on the one hand, and $p(r_1, \ldots, r_{n-1}, r_d)$ on the other hand from the candidate and reference vectors, verifies that $p_d(r_d)=p(r_1, \ldots, r_{d-1}, r_d)$, and in this case determines that the result of calculation of the distance is exact.

In an embodiment, the invention relates to a computer program product comprising instructions for conducting steps of:
acquisition of an image and conversion of said image into a biometric datum comprising n components,
acquisition of a biometric reference datum recorded in an identity document, the datum comprising n components,
comparison of the two data by calculation of a distance between the two data,
communication of the result and said data to a verification entity,
generation from each component $a_i$, $b_i$ of each datum of a function of a number d of variables $a(i_1, \ldots, i_d)$, $b(i_1, \ldots, i_d)$ where $d=\log_2 n$, defined for each variable on the set $\{0,1\}$, by reformulation of the index i of the component $a_i$, $b_i$ in binary format,
generation, from each function, of a polynomial of d variables $\tilde{a}(x_1, \ldots x_d)$ $\hat{b}(x_1, \ldots x_d)$ defined on a finite field, such that each polynomial $\tilde{a}$, $\hat{b}$ coincides with the corresponding function a,b on the set $\{0,1\}^d$, and generation, from the polynomials $\tilde{a}$ and $\hat{b}$ of a polynomial p of d variables of the same expression as the distance between the data,
engagement, with the verification entity, in a verification protocol comprising:
generation and sending to the verification entity of a polynomial $p_1$ such that $$p_1(X_1) = \sum_{x_2 \in \{0,1\} \ldots x_d \in \{0,1\}} p(X_1, x_2, \ldots, x_d)$$

for any j from 2 to d−1,
generation and sending to the verification entity, from values $r_1, \ldots r_{j-1}$ received, of a polynomial $p_j$ such that:

$$p_j(X_j) = \sum_{x_{j+1} \in \{0,1\} \ldots x_d \in \{0,1\}} p(r_1, \ldots, r_{j-1}, X_j, x_{j+1}, \ldots, x_d)$$

generation and sending to the verification entity of a polynomial $p_d$ such that:

$$p_d(X_d)=p(r_1, \ldots, r_{d-1}, X_d)$$

when it is executed by a computer.

The proposed method verifies the result of calculation of distance between at least two biometric data. For this the method utilises a protocol of «Sumcheck» type, which is applicable only to verifications of calculations of multivariate polynomials. The proposed method converts biometric data into multivariate polynomials to enable application of the «Sumcheck» protocol. This conversion can be done by a processing unit having limited calculation means.

The proposed method is applicable especially to distance calculations comprising calculation of a scalar product, such as the Euclidian distance squared or the Hamming distance.

Also the method is applicable to verification of the result of calculation of distance between a biometric datum and a plurality of biometric reference data, for identification applications, by combining the biometric reference data in a matrix for application of the «Sumcheck» protocol.

DESCRIPTION OF FIGURES

Other characteristics, aims and advantages of the present invention will emerge from the following detailed description with respect to the attached figures given by way of non-limiting examples and in which.

DETAILED DESCRIPTION OF AT LEAST ONE EMBODIMENT OF THE INVENTION

Authentication or Identification System

Figure 1:
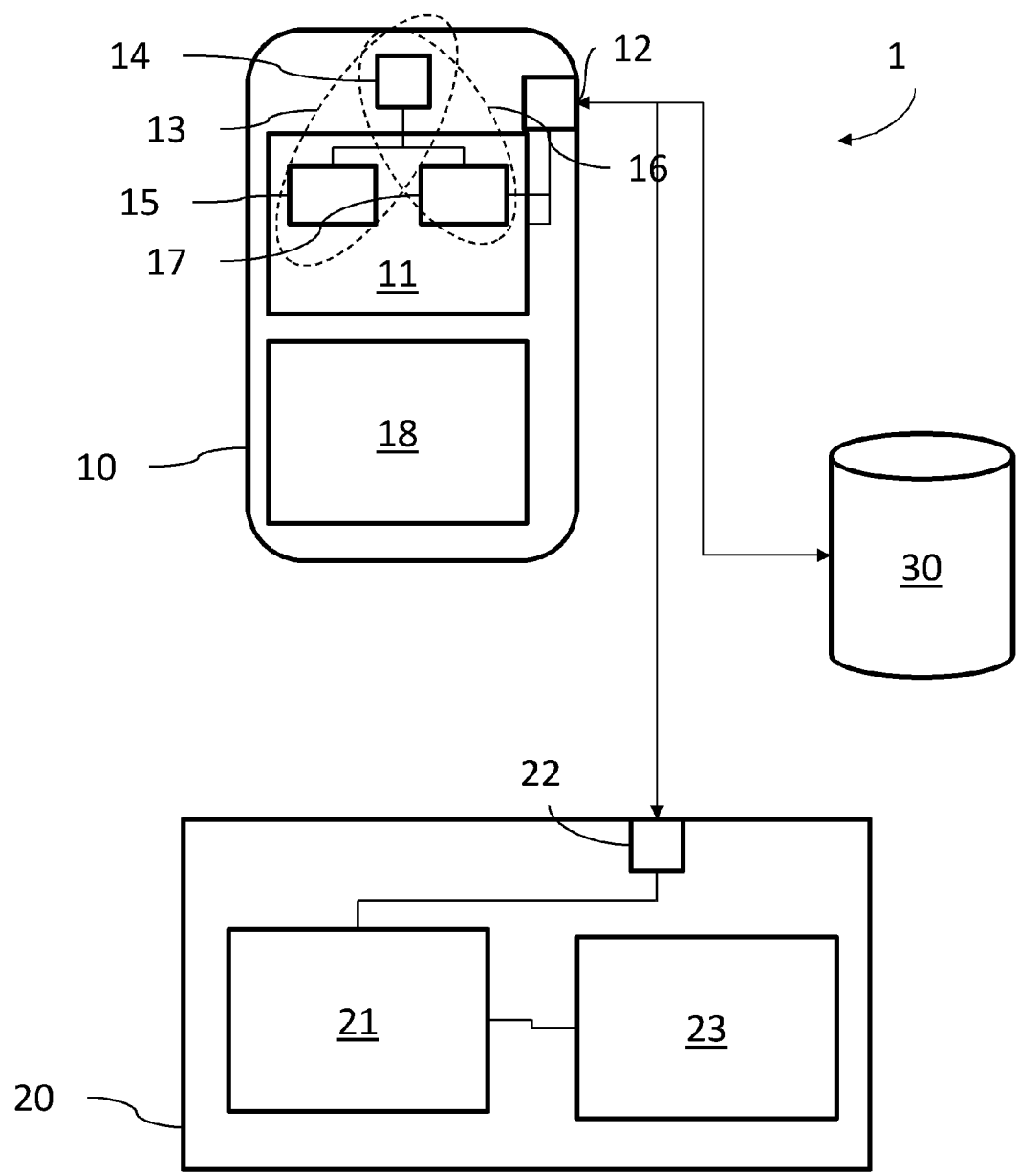
FIG. 1 schematically illustrates a system for biometric identification or authentication of an individual with verification of the result of comparison of the biometric data, FIG. 2 schematically illustrates the main steps of a method for processing biometric data according to an embodiment of the invention.

In reference to FIG. 1, this schematically illustrates a system 1 for biometric identification or authentication of individuals for verification of the result of authentication or identification.

This system comprises two processing units 10, 20. The first processing unit 10 is a unit personal to an individual, such as for example his mobile telephone, as explained hereinbelow. The second processing unit 20 is retained and controlled by an entity by which authentication or identification must be performed, for example a governmental entity, customs, a company, etc.

One of the processing units executes authentication or identification on biometric data, and then supplies the result to the other, which proceeds with verification of this result. In particular, in the case of authentication the first processing unit 10 performs authentication and supplies the result to the second processing unit 20 which verifies this result.

In the case of identification, it is preferably the second processing unit 20 which has access to a database comprising biometric reference data, and which performs biometric identification against these reference data from a biometric datum communicated by the first processing unit 10. The second processing unit 20 communicates to the first 10 the result of the calculation for the first unit to verify it.

All the same, in the case of identification the roles of calculation and verification can also possibly be reversed.

The processing unit 10, 20 making the calculation between the data for authentication or identification is hereinbelow called proving entity (or prover) P, and the processing unit 20, 10 performing verification of the calculation between the data is hereinbelow called verification entity (or verifier) V.

The first processing unit 10 comprises a computer 11, such as for example a processor, a microprocessor, a controller, a microcontroller, FPGA etc. This computer is adapted to execute code instructions for executing the method hereinbelow.

The first processing unit comprises advantageously a communications interface 12 letting it dialog remotely with the second processing unit 20, and if needed with a remote memory 30 described hereinbelow.

This communications interface 12 is preferably the combination of a wireless communications interface, for example of Wifi or Bluetooth type or a mobile telephony network (GPRS, 3G, 4G or other) and any other downstream communications network creating the link with the second processing unit 20 and/or the memory 30.

The first processing unit 10 also comprises an acquisition module 13 of a biometric datum on a biometric trait of an individual. The biometric trait can for example be the shape of the face, or one or more irises of the individual.

The acquisition module of the biometric datum 13 comprises an image sensor 14, such as for example digital photographic apparatus or a digital camera, adapted to acquire at least one image of a biometric trait of an individual, and a module 15 for processing images adapted to extract a biometric datum from an image of a biometric trait.

Extraction of the biometric datum is conducted by processing the image of the biometric trait which depends on the nature of the biometric trait. Processing images varies for extracting biometric data are known to the expert. By way of a non-limiting example, extraction of the biometric datum can comprise extraction of particular points or a shape of the face in the event where the image is an image of the face of the individual.

The image-processing module 15 is advantageously a program comprising a series of instructions which can be executed by the computer 11. This is preferably a software module.

The processing unit 10 also comprises a module 16 for acquisition or access to at least one biometric reference datum, for comparing a biometric datum acquired on an individual by the module 13 to said reference datum.

In an embodiment, the processing unit 10 performs authentication of the individual, that is, compares a biometric candidate datum, acquired on the individual to a single biometric reference datum, supposed to originate from the same individual, to verify that the individual from whom the two data have been obtained is one and the same.

In this case, the biometric reference datum utilised for authentication is advantageously a datum recorded in an identity document of the individual. For example, the biometric datum can be an image of the face featuring on an identity document, or again an image of the face or of at least one iris of the individual recorded in a RFID chip contained in the document.

According to the cases presented hereinabove, the module 16 comprises either an image sensor, advantageously the same image sensor 14 as that used for acquisition of the biometric candidate datum, or an RFID chip reader, for example a reader of NFC type.

The module 16 also comprises a program 17 executable by the computer, comprising code instructions for controlling the image sensor or the RFID chip reader, and if needed the processing of a biometric datum obtained by the sensor or the reader for extracting elements to be compared to the biometric candidate datum. For example if the biometric reference datum is a photograph of the face of the individual featured on the identity document, the program executable by the module can be configured to extract from the latter characteristic points of the face comparable to those extracted from the candidate datum.

As a variant, biometric identification of the individual can be carried out, during which the biometric candidate datum acquired on the individual is compared to a plurality of biometric reference data, so as to determine if one of the reference data corresponds to the candidate datum. The individual is identified as being the individual from whom the reference datum originates.

In this case the biometric reference data can be stored in a memory 30 remote from the first (and optionally the second) processing unit, such as for example a database managed by a private or governmental entity, etc.

If biometric identification is conducted by the first processing unit 10, this unit is adapted to access these data via the communications interface remotely 12. The module 16 comprises a program 17 executable by the computer 11 and comprising code instructions for controlling the communications interface remotely 12 for accessing the content of the memory 30. This is the case shown in FIG. 1.

As a variant, it is the second processing unit which performs identification and retains these means for access to the reference data.

Advantageously, all the functionalities of acquisition and processing a biometric candidate datum, access to a biometric reference datum, comparison between the candidate datum and the reference datum or data for performing authentication or identification, and participation in the verification method of the result of comparison with the second processing unit 20, are combined within the same program executable by the computer, advantageously a software application. Advantageously, the application can be downloaded remotely via the communications interface 12 to be installed on the processing unit 10.

The first processing unit can also comprise a Man Machine interface 18, typically though not limited to a touch screen, for displaying and receiving information and instructions for proper execution of the method described hereinbelow by an individual.

The second processing unit 20 comprises a computer 21, such as for example a processor, a microprocessor, a controller, a microcontroller, FPGA etc. This computer is adapted to execute code instructions for executing the method hereinbelow.

The second processing unit 20 comprises advantageously a communications interface 22 letting it dialog remotely with the first processing unit 10.

This communications interface 22 is preferably the combination of a wireless communications interface, for example of Wifi or Bluetooth type or mobile telephone network (GPRS, 3G, 4G or other) and any other downstream communications network forming the link with the first processing unit 10.

Advantageously, in the event where the system 1 performs biometric identification of individuals, this identification can be conducted by the second processing unit 20 which is adapted to remotely access the biometric reference data contained in the remote memory 30 via the communications interface 22.

It also comprises a module for access to the reference data comprising a program executable by the computer 21, and comprising code instructions for controlling the communications interface remotely 22 to access the content of the memory 30. This is a variant, not shown, of the case shown in FIG. 1.

The processing unit 20 comprises advantageously a Man Machine interface 23, for example a touch screen, or a monitor and a keyboard, for displaying and receiving information and instructions for executing the method described hereinbelow.

Highly advantageously, the first processing unit 10 described hereinabove is an electronic device personal to the individual, for example a mobile telephone or « smartphone », an electronic tablet or again a personal computer.

This lets an individual himself perform authentication prior to presenting the result thereof to the second processing unit 20. So the time-consuming authentication step comprising acquisition of a fresh biometric datum on the individual and its comparison with one or more reference data is connected upstream of a control by the second processing unit 20.

An example of application is an individual passing through customs. The latter can use his personal electronic device to perform biometric authentication against his passport before passing through customs. Then, at the time of passing through customs the individual supplies the result to the second processing unit 20 acting as verification entity V (controlled by a governmental authority, for example customs) by means of his personal device 10. The verification entity then goes ahead with verification, reducing time taken passing through customs and therefore the associated wait lines.

Another example of application is an individual embarking on transport means, for example an aircraft. Prior to embarking the individual can acquire a fresh biometric datum by means of his device personal 10 and communicate this datum to the second processing unit 20. This unit performs identification against a list of passengers recorded for embarking, and at the time of embarking sends only the proof of this identification to the personal device 10 of the individual as verification entity V.

From here on, the method is described in reference to the proof P and verification V entities without specifying the corresponding processing units, given that in the case of authentication the proving entity P is the first processing unit 10, while in the case of identification the proving entity P is preferably the second processing unit 20.

Method for Authentication or Identification with Verification

Figure 2:
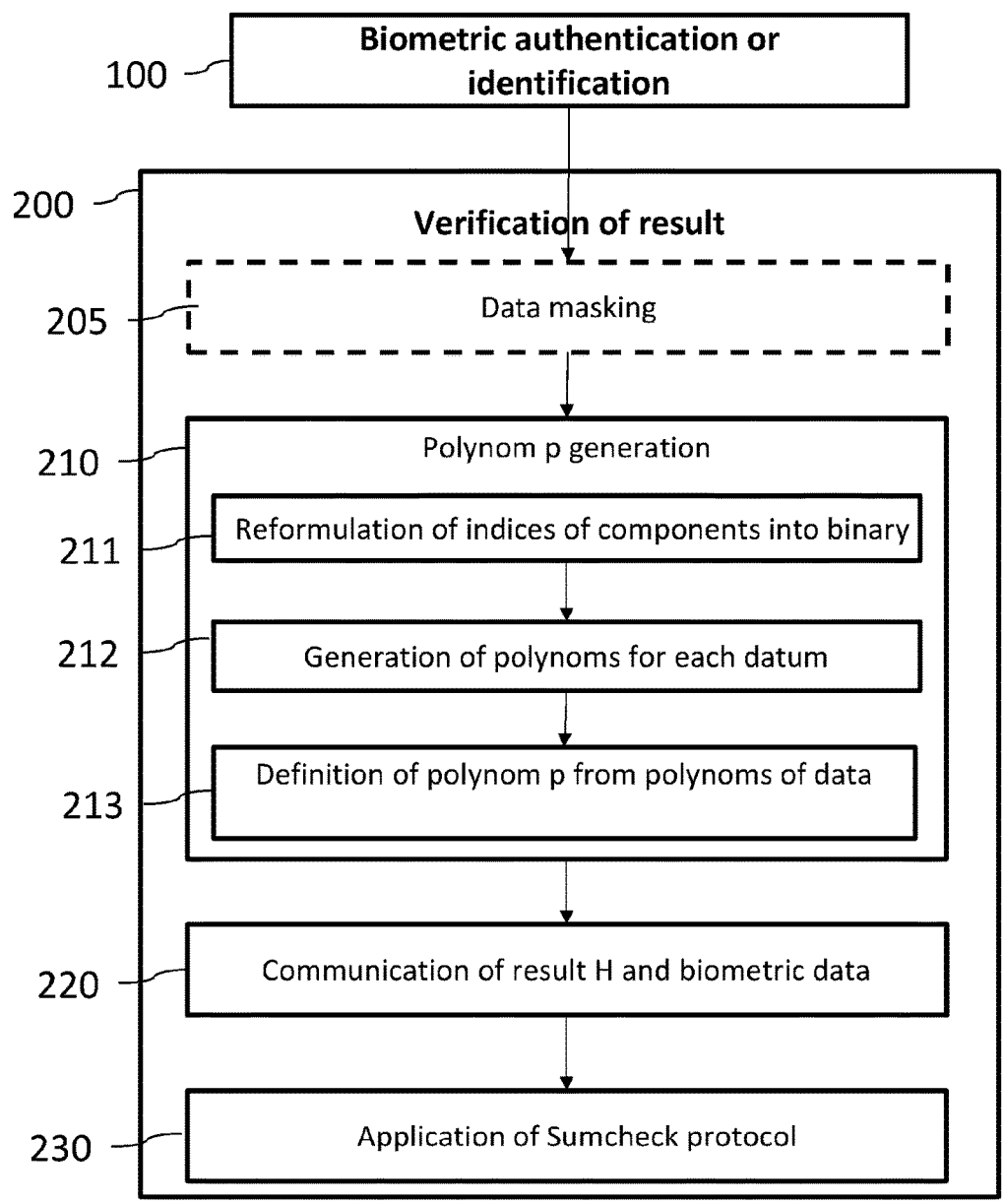

In reference to FIG. 2, a method for authentication or identification executed by the system 1 described hereinabove will now be described.

During a first step 100, the proving entity P performs authentication or biometric identification of an individual.

This step previously comprises the recovery by the proving entity P of a biometric candidate datum and at least one biometric reference datum.

Acquisition of the biometric candidate datum is performed by the acquisition module 13 of biometric candidate datum of the first processing unit 10, for example by acquisition of a photograph of a biometric trait of the individual, then processing to obtain a datum. If needed, this datum is sent to the proving entity P if the latter is the processing unit 20.

Acquisition of the biometric reference datum or data can be conducted by the module 16 for access to one or more biometric reference data accede of the first processing unit 10, which accesses a biometric datum recorded in the chip of a passport by reading the chip, or a set of data recorded in the database 30.

As a variant, it can be performed by a module having access to reference data recorded in the remote memory 30 of the second processing unit 20.

The proving entity P then compares the biometric candidate datum to the biometric reference datum or the biometric reference data. Performing the comparison comprises calculation of a distance between the data, whereof the definition varies as a function of the nature of the relevant biometric data. Calculation of the distance comprises calculation of a polynomial between the components of the biometric data, and advantageously calculation of a scalar product.

For example, in the event where the biometric data have been obtained from images of an iris, a distance conventionally used for comparing two data is the Hamming distance. In the event where the biometric data have been obtained from images of the face of an individual, it is appropriate to use the Euclidian distance.

This type of comparison is known to the expert and will not be described in more detail hereinabove.

The individual is authenticated or identified if the comparison reveals a degree of similarity between the candidate datum and a reference datum exceeding a certain threshold, whereof the definition depends on the calculated distance.

Verification of the Comparison

The method then comprises a verification step 200 of the result of the comparison between the biometric data. This step is conducted conjointly by the proving entity P and the verification entity V.

Each biometric datum is a vector comprising an integer n of indexed components, n being strictly greater than 1. Of note, $a=(a_1, \ldots, a_n)$ and $b=(b_1, \ldots b_n)$ the candidate and reference biometric data, respectively, with their components $a_i, b_i \in \mathbb{Z}$.

The verification step 200 comprises a first step 210 during which the proving entity P generates, from the biometric data involved in the comparison, a multivariate polynomial of same formula as the formula of the distance applied between the biometric data and which coincides with the value of the distance in the values of the components.

For this to happen, in noting $d=\log_2 n$, the proving entity P first generates during a sub-step 211 for each datum a,b, a function $f_a, f_b$ of d variables, by reformulating the index i of each component of the datum in a binary vector $(i_1, \ldots i_d)$ where the $i_j$ are at values in $\{0,1\}$.

The functions $f_a$ and $f_b$ are defined as:

$$f_a: (i_1, \ldots i_d) \mapsto a_i$$

$$f_b: (i_1, \ldots i_d) \mapsto b_i$$

The functions $f_a$ and $f_b$ are defined on $\{0,1\}^d$.

During a sub-step 212, the proving entity P extends the field of definitions of these functions by generating from these functions polynomials of d variables defined on $\mathbb{F}^d$ where $\mathbb{F}$ is a finite field (Galois field).

For $x_k \in \{0,1\}$, a function $\chi_{x_k}$ defined on the field $\mathbb{F}$ is defined by:

$$\begin{cases} \chi_{x_k}(x) = 1-x & \text{if } x_k = 0 \\ \chi_{x_k}(x) = x & \text{if } x_k = 1 \end{cases}$$

If the input x of the function belongs to $\{0,1\}$, this function returns the value 1 if $x=x_k$ and 0 if not.

By noting v a vector comprising d binary components, and $x \in \mathbb{F}^d$ note $\chi_v$ the extension of the function $\chi_{x_k}$ equal to 1 if the vector x is equal to v and 0 if not, this function $\chi_v$ being defined as follows:

$$\chi_v(x_1, \ldots, x_d) = \prod_{k=1}^{d} \chi_{v_k}(x_k)$$

where k is a silent index with whole values between 1 and d.

During sub-step 212, the proving entity P generates two d-variable polynomials $\tilde{a}, \tilde{b}$ defined on the field $\mathbb{F}^d$ respectively from the functions a and b as follows:

$$\forall x \in \mathbb{F}^d, \tilde{a}(x) = \sum_{i=(i_1,\ldots,i_d) \in \{0,1\}^d} f_a(i) \chi_i(x)$$

$$\forall x \in \mathbb{F}^d, \tilde{b}(x) = \sum_{i=(i_1,\ldots,i_d) \in \{0,1\}^d} f_b(i) \chi_i(x)$$

The polynomial $\tilde{a}$ (respectively $\tilde{b}$) is a multilinear extension of the function $f_a$ (respectively $f_b$), since the right-hand term in the definition of the polynomial is equal to $f_a (i_1, \ldots, i_d)$ (respectively $f_b(i_1, \ldots, i_d)$) for each $(i_1, \ldots, i_d) \in \{0,1\}^d$, and therefore the components of the datum a (respectively b). These polynomials are also of a degree of at most 1 in each variable.

On completion of these sub-steps, the distance between the two biometric data can therefore be reformulated with these polynomials.

For this to happen, the proving entity P generates during a sub-step 213, from the polynomials $\tilde{a}$ and $\tilde{b}$ a polynomial p of d variables. The polynomial p is of the same expression as the expression of the distance between the biometric data, that is, the formula applied to the biometric data to obtain the distance between the data is identical to that applied to the polynomials $\tilde{a}$ and $\tilde{b}$ to obtain the polynomial p.

By construction of the polynomials $\tilde{a}$ and $\tilde{b}$, the polynomial p agrees with the value of the distance between the biometric data on the set $\{0,1\}^d$. Some examples of polynomials p are provided below In particular, some distances such as Hamming distance and the Euclidian distance comprise calculation of a scalar product between the two compared data.

In reprising the initial expressions of the biometric data $a=(a_1, \ldots, a_n)$ and $b=(b_1, \ldots b_n)$, the scalar product is calculated $a \cdot b = \sum_{i=1}^{n} a_i b_i$.

If the formula of the distance between the two data is equal to that of the scalar product, the polynomial p is written as follows, reprising the expressions of the polynomials $\tilde{a}$ and $\tilde{b}$:

$$p(x_1, \ldots, x_d) = \tilde{a}(x_1, \ldots, x_d) \cdot \tilde{b}(x_1, \ldots, x_d)$$

The square of the Euclidian distance between two biometric data is written as follows:

$$(a-b)^2 = a^2 + b^2 - 2a \cdot b = \sum_{i=1}^{n} a_i^2 + b_i^2 - 2a_i \cdot b_i$$

The polynomial p for reformulating this distance is written as:

$$p(x_1, \ldots, x_d) = \tilde{a}(x_1, \ldots, x_d) \cdot \tilde{a}(x_1, \ldots, x_d) + \tilde{b}(x_1, \ldots, x_d) \cdot \tilde{b}(x_1, \ldots, x_d) - 2\tilde{a}(x_1, \ldots, x_d) \cdot \tilde{b}(x_1, \ldots, x_d).$$

In the event where the distance between the data is the Hamming distance, this distance supplies the number of different bits between the two compared biometric data. The Hamming distance is written as:

$$\text{card}\{i \text{ such as } a_i \neq b_i\}$$

Given that the components of the biometric data are always equal either to 0 or to 1, as $a_i$ equals 0 or 1, the result is always obtained: $a_i^2 = a_i$ and idem for $b_i$.

Also, $(a_i - b_i)^2 = 0$ if $a_i = b_i$ and $(a_i - b_i)^2 = 1$ if $a_i \neq b_i$, since only the four following cases are possible:

$a_i = b_i = 1$, and then $(a_i - b_i)^2 = 0^2 = 0$, $a_i = b_i = 0$, and then $(a_i - b_i)^2 = 0^2 = 0$, $a_i = 1$ and $b_i = 0$, and then $(a_i - b_i)^2 = 1^2 = 0$, $a_i = 0$ and $b_i = 1$, and then $(a_i - b_i)^2 = (-1)^2 = 0$.

Because of this the Hamming distance can be reformulated as follows:

$$\text{card}\{i \text{ such as } a_i \neq b_i\} =$$

$$\sum_{i=1}^{n} (a_i - b_i)^2 = \sum_{i=1}^{n} a_i^2 + b_i^2 - 2a_i \cdot b_i = \sum_{i=1}^{n} a_i + b_i - 2a_i \cdot b_i$$

The polynomial p of several variables generated from the formula of the Hamming distance is therefore the following:

$$p(x_1, \ldots, x_d) = \tilde{a}(x_1, \ldots, x_d) + \tilde{b}(x_1, \ldots, x_d) - 2\tilde{a}(x_1, \ldots, x_d) \cdot \tilde{b}(x_1, \ldots, x_d)$$

The verification step 200 also comprises a step 220 during which the proving entity P sends the verification entity V the following elements:
  the result of the calculation of the distance between the biometric data, note H, for the result of this calculation to be verified by the verification entity, and
  the biometric data a,b having served as basis for calculation.

Advantageously, though optionally, in the event where the proving entity P originally retains the candidate datum and the reference data (typically, this is authentication), the proving entity P can mask the biometric data prior to generating from these data the polynomial p and sending the result H and these data to the verification entity V, to preserve their confidentiality. The masking is adapted to preserve the value of the calculated distance between the data, that is, the distance between the masked data is equal to the distance between the non-masked data.

In the case of authentication based on facial recognition (biometric data obtained from images of the face of the individual), calculation of distance conducted between the data is that of a Euclidian distance. The masking is performed by randomly generating a permutation $\pi$ and a vector of n components $(t_1, \ldots t_n)$ in the finite field, and by permutating the datum and adding the randomly generated vector to it.

By noting $c_1, \ldots c_n$ an initial datum, it is masked in $c_m$ such as:

$$c_m = \pi(c) + (t_1, \ldots, t_n)$$

It is evident that the square of the Euclidian distance between two masked data $c_{ref}$ and c is written as:

$$(\pi(c_{ref}) + (t_1, \ldots, t_n) - \pi(t_1, \ldots, t_n))^2 = (\pi(c_{ref}) - \pi(c))^2 = (c_{ref} - c)^2$$

Masking therefore retains the value of the distance between the data.

In the case of authentication based on iris recognition (biometric data obtained from images of iris of the individual), calculation of distance conducted between the data is that of a Hamming distance. Masking is performed by randomly generating a permutation $\pi$ and a vector of n components $(t_1, \ldots t_n)$ in the finite field $\mathbb{F}$, and by performing the operation « exclusive or » (XOR) between the permutated datum and the random vector:

$$c_m = \pi(c) \text{XOR}(t_1, \ldots, t_n)$$

So as to retain the distance between the biometric data before and after masking, the circular permutation and the randomly generated vector are the same for the biometric candidate datum and the biometric reference datum or the biometric reference data.

Masking step 205 is conducted prior to calculation step 210 of the polynomial p and communication step 220 of the data and of the result H of the distance.

Next, during a step 230 the proving entity P and the verification entity V engage in a verification protocol of the result H, called «Sumcheck» protocol. The Sumcheck protocol has been described in the publication "Algebraic methods for interactive proof systems" by Lund, Fortnow, Karloff et Nisan, in Journal of the Association for Computing Machinery, 1992.

The «Sumcheck» protocol applies in general to verification of a result in the form:

$$\sum_{x_1 \in \{0,1\}} \sum_{x_2 \in \{0,1\}} \cdots \sum_{x_n \in \{0,1\}} g(x_1, \ldots, x_n)$$

Where g is a polynomial of n variables defined on $\mathbb{F}^d$ and of degree d.

Now, step 210 described hereinabove has returned the expression of the distance between the biometric data to such a polynomial. Consequently the Sumcheck verification protocol of the value of the result H can be applied by replacing g in the equation hereinabove by the polynomial p defined during step 210, since the value H of the distance between the biometric data sent to the verification entity V corresponds to the following value:

$$H = \sum_{x_1 \in \{0,1\}} \sum_{x_2 \in \{0,1\}} \cdots \sum_{x_n \in \{0,1\}} p(x_1, \ldots, x_n)$$

Performing the Sumcheck protocol will now be described.

Description of the «Sumcheck» Protocol

During a first step, the proving entity P generates a polynomial $p_1$ of one variable such that:

$$p_1(X_1) = \sum_{x_2 \in \{0,1\} \ldots x_d \in \{0,1\}} p(X_1, x_2, \ldots, x_d)$$

The proving entity P communicates the polynomial $p_1$ to the verification entity V.

The verification entity V verifies that the sum $p_1(0) + p_1(1)$ of the evaluations of the polynomial $p_1$ in 0 and 1 is equal to the result H of the calculation of the distance it received at step 220. If this is not the case, the verification entity V rejects the result H as being erroneous. If not, the verification entity V continues the protocol as follows.

For any j from 2 to d-1, a series of identical exchanges takes place between the verification entity and the proving entity, each exchange occurring as follows.

The verification entity V randomly generates a value $r_{j-1}$ in the finite field and communicates it to the proving entity P, The proving entity P generates a polynomial $p_j$ such that:

$$p_j(X_j) = \sum_{x_{j+1} \in \{0,1\} \ldots x_d \in \{0,1\}} p(r_1, \ldots, r_{j-1}, X_j, x_{j+1}, \ldots, x_d)$$

and send the verification entity V the polynomial $p_j$,

The verification entity V determines the value of the polynomial $p_{j-1}$ in $r_{j-1}$ and the value of the polynomial $p_j$ in 0 and in 1, and verifies that $p_{j-1}(r_{j-1}) = p_j(0) + p_j(1)$.

If the equality is not verified, the verification entity V determines that the result of the calculation of the distance is false.

If the equality is verified, the protocol continues by incrementing j by 1.

On completion of the iterations of j going from 2 to d−1, if all verifications have been satisfied, the verification entity V randomly generates a value $r_d$ in the finite field $\mathbb{F}$ The proving entity P generates a polynomial $p_d$ such that:

$$p_d(X_d)=p(r_1, \ldots, r_{d-1}, X_d)$$

and sends the verification entity V the polynomial $p_d$.

The verification entity V determines $p_d(r_d)$ on the one hand from the polynomial $p_d$ sent by the proving entity P and of the value $r_d$ which it has generated.

On the other hand, the verification entity V determines the value $p_1(r_1, \ldots, r_{d-1}, r_d)$ from the biometric data which the proving entity P sends it. For this to happen, the verification entity V reconstructs the polynomial p in the same way as described in reference to step 210 of the method from the biometric data, and evaluates the polynomial in the values $r_1, \ldots r_d$ which it has generated.

The verification entity V verifies that $p_d(r_d)=p(r_1, \ldots, r_{d-1}, r_d)$, and in this case determines that the result H of calculation of the distance is exact, with a very high probability.

In fact, it has been shown that two different polynomials of degree d whereof the inputs are at values in the field can coincide at a maximum as there is a proportion of $d/\mathbb{F}$ points. As a consequence, if the result H of calculation of the distance of the biometric data by the proving entity P is exact, the verification entity V will always accept it, and if it is false, the probability that the verification entity V rejects it is greater than $$\left(1-\frac{d}{|\mathbb{F}|}\right)^n.$$

In the context of the protocol, $|\mathbb{F}| \gg d$ such that the probability that the verification entity V rejects the result is greater than $1-nd/|\mathbb{F}|$.

Variant Implementations of the Protocol

In the description preceding the «Sumcheck» protocol, when the proving entity P communicates a polynomial $p_j$, j being between 1 and d, to the verification entity V, it can do this by sending the coefficients of the polynomial to the verification entity V. The verification entity V then evaluates the polynomial obtained in 0 and in 1 for all the iterations where it must verify the sum of the evaluation of the polynomial in 0 and in 1.

Alternatively, the proving entity P can provide the verification entity V with a sufficient number of evaluations of the polynomial at different points so that the verification entity V can then interpolate the polynomial, that is, a number of evaluations strictly greater than the degree of the polynomial.

In the event where the polynomial corresponds to a distance involving calculation of a scalar product, as per the definition which has been given of the polynomials and, these polynomials are of degree 1 in each variable and the polynomial p is of degree at most plus 2 in each variable. In this case all the proving entity P must do is send the evaluation of the polynomials $p_j$ for j=1 to d in only three values.

Indeed, it is known (see the document «Time-Optimal Interactive Proofs for Circuit Evaluation», Justin Thaler et al., in Network and Parallel Computing, 2013) to perform Sumcheck to polynomial derived from matrices, and not from vectors (it is reminded that each biometric datum is a vector comprising an integer n of indexed components).

Consequently, the polynomial derived from matrices will have variables corresponding to each dimension. In such case, Thaler proposes to use a first challenge to somehow ask a question to the proving entity P on the value of a term of the product matrix, the value being possible proved with the Sumcheck protocol.

In the present case, the derived expression allows to apply directly (i.e. without challenge) and efficiently (one less interaction is required) the Sumcheck protocol. It means that the application of the Sumcheck protocol comprises directly, i.e. without intermediate step of challenge, the generation par the proving entity P from the polynomial p of the j polynomial $p_j$ of a single variable.

Preferably, for the polynomials $p_j$, j=1 à d−1, the proving entity P sends the evaluations of these polynomials in 0, in 1, and in any third value, since this enables the verification entity V to directly reutilise the values in 0 and in 1 for verification it brings to each iteration.

It is also possible to make implementation of the Sumcheck protocol and especially expression of the polynomials $p_j$, j from 2 to d, from the polynomial p, more effective.

Let A and B be two tables of size n.

Tables A and B are generated by the proving entity P so as to comprise initially all the possible values of the polynomials $\tilde{a}(x_1, \ldots, x_d)$ and $\tilde{b}(x_1, \ldots x_d)$ for $(x_1, \ldots x_d) \in \{0,1\}^d$.

During an iteration j of the Sumcheck protocol, j going from 2 to d−1, the polynomials $p_j$ must be evaluated in points of the form $(r_1, \ldots, r_{j-1}, t, x_{j+1}, \ldots x_d)$, where t can assume the values 0, 1, and a third value, and the $(x_{j+1}, \ldots, x_d) \in \{0,1\}^d$. This involves also evaluating the polynomials $\tilde{a}$ and $\tilde{b}$ at points of the same form. At each iteration the evaluations of these polynomials can be simplified by reusing results of a previous iteration.

For example, for the polynomial $p_2$, there is $$G=\tilde{a}(r_1, x_2, \ldots, x_d)$$

As per the definition of the polynomial:

$$= \sum_{i_1, \ldots, i_d \in \{0,1\}^d} \chi_{i_1}(r_1) a(i_1, \ldots, i_d) \prod_{k=2}^{d} \chi_{i_k}(x_k)$$

$$G = \sum_{i_2, \ldots, i_d \in \{0,1\}^{d-1}} \chi_0(r_1) a(0, \ldots, i_d) \prod_{k=2}^{d} \chi_{i_k}(x_k) +$$

$$\sum_{i_2, \ldots, i_d \in \{0,1\}^{d-1}} \chi_1(r_1) a(1, \ldots, i_d) \prod_{k=2}^{d} \chi_{i_k}(x_k)$$

$$G = \sum_{i_2, \ldots, i_d \in \{0,1\}^{d-1}} (1-r_1) a(0, \ldots, i_d) \prod_{k=2}^{d} \chi_{i_k}(x_k) +$$

$$\sum_{i_2, \ldots, i_d \in \{0,1\}^{d-1}} r_1 a(1, \ldots, i_d) \prod_{k=2}^{d} \chi_{i_k}(x_k)$$

As per the definition of the function this gives $$G=\tilde{a}(r_1,x_2,\ldots,x_d)=\tilde{a}(0,x_2,\ldots,x_d)(1-r_1)+\tilde{a}(1,x_2,\ldots,x_d)r_1$$

It is evident therefore that evaluation of the polynomial $p_2$ in 0 or in 1 can be done directly from the value of $r_1$ and the values of the polynomials $\tilde{a}$ and $\tilde{b}$, which are initially in tables A and B.

For evaluation of the polynomial $p_2$ in the third value of t, the same type of reasoning produces an expression which uses only values stored in tables A and B:

$$\tilde{a}(r_1,t,x_3,\ldots,x_d)=(1-t)((1-r_1)\tilde{a}(0,0,x_3,\ldots,x_d)+r_1 a(1,0,x_3,\ldots,x_d))+t((1-r_1)\tilde{a}(0,1,x_3,\ldots,x_d)+r_1\tilde{a}(1,1,x_3,\ldots,x_d))$$

More generally, for any j between 2 and d−1, evaluation of the polynomial $p_j$ can be calculated rapidly as a function of the value of $r_{j-1}$, of t and of the values $\tilde{a}(r_1,\ldots,r_{j-2},x_{j-1},\ldots x_d)$ and $\tilde{b}(r_1,\ldots r_{h-2},x_{j-1},\ldots x_d)$ obtained at the previous iteration, and which are recorded at each iteration by the proving entity in the updated tables A and B. $A^{(j)}$ and $B^{(j)}$ are noted as the version updated at the iteration j of tables A and B.

Consequently, during each iteration of the exchange phase of the Sumcheck protocol, with j between 2 and d,
- for each polynomial $\tilde{a}, \tilde{b}$ the proving entity P has a table $A^{(j)}, B^{(j)}$ comprising respectively all the possible values of functions $\tilde{a}(r_1,\ldots r_{j-2},x_{j-1},\ldots x_d)$ and $\tilde{b}(r_1,\ldots r_{j-2},x_{j-1},\ldots x_d)$ for $(x_{j-1},\ldots x_d)\{0,1\}^{d-j+1}$, where the values $r_1,\ldots,r_{j-1}$ are the values generated randomly by the verification entity V and sent to the proving entity P during an iteration j,
- evaluation of a polynomial $p_j$ in a value t is performed from the values t, $r_{j-1}$ and the values of tables $A^{(j)}, B^{(j)}$, and
- the proving entity P increments the tables $A^{(j+1)}, B^{(j+1)}$ for the iteration j+1 by replacing their values by all the possible values $\tilde{a}(r_1,\ldots r_{j-1},x_1,\ldots x_d)$ and $\tilde{b}(r_1,\ldots r_{j-1},x_j,\ldots x_d)$ for $(x_1,\ldots x_d)\in\{0,1\}^{d-j}$.

The total cost for implementation of the protocol by the proving entity P is in $O(2^d)=O(n)$.

Case of Calculation of a Scalar Product with Several Reference Data

In the event where the proving entity P performs biometric identification of the individual it can calculate a distance between the biometric candidate datum and each of a plurality of biometric reference data. As indicated hereinabove, this case is preferably conducted with the second processing unit 20 as proving entity, and the first processing unit 10 as verification entity V. Then the first processing unit 10 will have been previously sent the biometric candidate datum a to the second processing unit 20.

Advantageously, in the case of identification where calculation of the distance comprises that of a scalar product between the candidate datum and each reference datum, verification is preferably conducted at the same time on the set of distance calculations and the steps described hereinabove are taken identically by combining the reference data into a matrix.

Therefore, in noting m as the number of biometric reference data, where m is a whole number strictly greater than 1, M a matrix of n lines and m columns which represents all biometric reference data, $f_a$ a function which at an index value i associates the index component i of the candidate datum a, and M(j,i) a function which at a couple of indices (j,i) associates the value of $M_{j,i}$, the scalar product q between the candidate datum and each reference datum is noted:

$$\forall i \in \{1,\ldots,m\}, q(i) = \sum_{j=1}^{n} f_a(j)M(j,i)$$

During sub-step 211, while noting $d=\max(\log_2 n, \log_2 m)$, indices of the components of the biometric candidate datum and the matrix of the reference data can be reformulated into binary. The scalar product is rewritten as follows:

$$\forall (i_1,\ldots,i_d) \in \{0,1\}^d,$$
$$q(i_1,\ldots,i_d) = \sum_{j_1,\ldots,j_d \in \{0,1\}^d} f_a(j_1,\ldots,j_d)\cdot M(j_1,\ldots,j_d,i_1,\ldots,i_d)$$

The extension sub-step 212 of functions $f_a$ and M to $\mathbb{F}^d$ where $\mathbb{F}$ is a finite field can also be conducted mutatis mutandis. In noting $\tilde{a}$ and $\tilde{M}$ the respective extensions of $f_a$ and M on the field $\mathbb{F}^d$ the previous relation then becomes:

$$\forall (x_1,\ldots,x_d) \in \mathbb{F}^d,$$
$$\tilde{q}(x_1,\ldots,x_d) = \sum_{j_1,\ldots,j_d \in \{0,1\}^d} \tilde{a}(j_1,\ldots,j_d)\cdot \tilde{M}(j_1,\ldots,j_d,x_1,\ldots,x_d)$$

During sub-step 213, the polynomial p corresponding to the scalar products and coinciding with the scalar products on the biometric data on $\{0,1\}^d$ is:

$$p(x_1,\ldots,x_d)(j_1,\ldots,j_d)=\tilde{a}(j_1,\ldots,j_d)\cdot\tilde{M}(j_1,\ldots,j_d,x_1,\ldots,x_d)$$

During step 220, the proving entity P sends the verification entity V the reference data, and the result q of the scalar product between the biometric datum and the matrix of the reference data M: $M:\forall i\in(1,\ldots,m), q(i)=\Sigma_{j=1}^{n}f_a(j)M(j,i)$.

Before the Sumcheck protocol is performed, the verification entity V calculates an extension $\tilde{q}$ of q on the field $\mathbb{F}^d$, and randomly generates a vector $r=(r_1,\ldots r_d)$ in $\mathbb{F}^d$ which it sends to the proving entity. The proving entity P then sends the verification entity the value $\tilde{q}(r)$.

Next, the Sumcheck protocol is performed identically by replacing the polynomial p hereinabove in the protocol by $p_{(r_1,\ldots,r_d)}(j_1,\ldots,j_d)$, to verify the correctness of the value of $\tilde{q}(r)$, final verification needing only the knowledge of functions $\tilde{a}$ and $\tilde{M}$. On completion of the protocol, the fact that the value of $\tilde{q}$ evaluated in a randomly generated datum by the verification entity has been verified by the verification entity proves that calculation of the scalar product between the biometric and reference data is exact.

The method proposed hereinabove exploits the Sumcheck protocol on verification of authentication or biometric identification. The role played by the proving entity in implementing this protocol needs no capacity for substantial calculations, which is well adapted to implementation by a device personal to an individual, such as a mobile telephone.

The invention claimed is:
1. A method for processing biometric data, the method being executed by a proving entity (P) and a verification entity (V), each entity being a processing unit comprising processing and communication means with the other entity, the method comprising the following steps:
- communicating, by the proving entity (P), to the verification entity (V) the result of a calculation of distance between a biometric candidate datum (a) and at least one biometric reference datum (b), each comprising a number n of indexed components ($a_i$, $b_i$), and said data, said calculation of distance comprising that of a polynomial of the components of the biometric data,
- generating, by the proving entity (P), from each datum a function of a number d of variables $f_a(i_1, \ldots, i_d)$, $f_b(i_1, \ldots, i_d)$ where $d=\log_2 n$, defined for each variable on the set $\{0,1\}$, by reformulation of the index i of each component ($a_i$, $b_i$) in binary format,
- generating, by the proving entity (P), from each function a polynomial of d variables $\tilde{a}(x_1, \ldots x_d)$, $\tilde{b}(x_1, \ldots x_d)$ defined on $\lambda^d$ where $\|$ is a finite field, such that each polynomial $\tilde{a}$, $\tilde{b}$ coincides with the corresponding function $f_a, f_b$ on the set $\{0,1\}^d$, and
- generating, by the proving entity (P) from the polynomials $\tilde{a}$, $\tilde{b}$ a polynomial $p(x_1, \ldots, x_d)$ of d variables of the same expression as that of the distance between the data,
- engaging, by the proving entity (P) and the verification entity (V), in a Sumcheck protocol applied to the polynomial p to verify the result of the calculation of the distance between the data, and
- verifying of the result of calculation of distance between the biometric candidate datum and the at least one biometric reference datum.

2. The method as claimed in claim 1, in which calculation of distance comprises that of a scalar product, and the polynomial p comprises at least one term g equal to a scalar product between the polynomials $\tilde{a}$ and $\tilde{b}$:

$$g(x_1, \ldots, x_d) = \tilde{a}(x_1, \ldots, x_d) \cdot \tilde{b}(x_1, \ldots, x_d).$$

3. The method as claimed in claim 2, in which the calculated distance is the square of the Euclidian distance, and the polynomial p is written as:

$$p(x_1, \ldots, x_d) = \tilde{a}(x_1, \ldots, x_d) \cdot \tilde{a}(x_1, \ldots, x_d) + \tilde{b}(x_1, \ldots, x_d) \cdot \tilde{b}(x_1, \ldots, x_d) - 2g(x_1, \ldots, x_d).$$

4. The method as claimed in claim 2, in which the calculated distance is the Hamming distance, and the polynomial p is written as:

$$p(x_1, \ldots, x_d) = \tilde{a}(x_1, \ldots, x_d) + \tilde{b}(x_1, \ldots, x_d) - 2g(x_1, \ldots, x_d).$$

5. The method as claimed in claim 1, in which the biometric candidate datum and the biometric reference datum or the biometric reference data are initially retained by the proving entity (P), and the method comprises a preliminary step of masking, by the proving entity (P), biometric data, said masking comprising the random generation of a circular permutation and a vector of n components, and performing a sum or the operation « exclusive or » between each datum permutated by the circular permutation and the randomly generated vector.

6. The method as claimed in claim 1, in which each polynomial $\tilde{a}(x_1, \ldots, x_d)$ and $\tilde{b}(x_1, \ldots, x_d)$ is of degree a in each variable.

7. The method as claimed in claim 6, in which the polynomial $\tilde{a}(x_1, \ldots, x_d)$ is defined by:

$$\forall x \in F^d, \tilde{a}(x) = \sum_{i=(i_1, \ldots, i_d) \in \{0,1\}^d} a(i) x_i(x)$$

with:

$$x_v(x_1, \ldots, x_d) = \prod_{k=1}^{d} \chi_{v_k}(x_k)$$

and where the function $Xv_k(x_k)$ is defined, for $x_k \in \{0,1\}$, by:

$$\begin{cases} \chi_{v_k}(x_k) = 1 - x_k & \text{if } v_k = 0 \\ \chi_{v_k}(x_k) = x_k & \text{if } v_k = 1 \end{cases}$$

8. The method as claimed in claim 6 wherein calculation of distance comprises that of a scalar product, and the polynomial p comprises at least one term g equal to a scalar product between the polynomials $\tilde{a}$ and $\tilde{b}$:

$$g(x_1, \ldots, x_d) = \tilde{a}(x_1, \ldots, x_d) \cdot \tilde{b}(x_1, \ldots, x_d)$$

in which the application of the Sumcheck protocol directly comprise generating by the proving entity (P) j polynomials $p_j$ of a single variable from the polynomial p, and transmitting to the verification entity (V) evaluations of each polynomial $p_j$ in three points for the verification entity (V) to interpolate the polynomial $p_j$.

9. Method according to claim 8, wherein for each polynomial $p_j$, for j from 1 to $d-1$, the proving entity (P) transmits the evaluations of these polynomials in 0, 1, and a third value t.

10. The method as claimed in claim 7, in which the application the Sumcheck protocol comprises a series of iterations for j from 2 to $d-1$ during which the verification entity (V) randomly generates and communicates to the proving entity a value $r_{j-1}$, and the proving entity (P) generates a polynomial:

$$p_j(X_j)^n = \sum_{x_{j+1} \in \{0,1\} \ldots x_d \in \{0,1\}} p(r_1, \ldots, r_{j-1}, X_j, x_{j+1}, \ldots, x_d)$$

and, at each iteration,
- the proving entity (P) has for each polynomial $\tilde{a}$, $\tilde{b}$ a table $A^{(j)}$, $B^{(j)}$ comprising respectively all the possible values of the functions $\tilde{a}(r_1, \ldots r_{j-2}, x_{j-i}, \ldots x_d)$ and $\tilde{b}(r_1, \ldots r_{j-2}, x_{j-i}, \ldots x_d)$ for $(x_{j-i}, \ldots x_d) \in \{0,1\}^{d-j+1}$, where each value $r_k(k=1, \ldots j-2)$ has been generated randomly by the verification entity and sent to the proving entity during the preceding iterations,
- evaluation of a polynomial $p_j$ in a value t is performed by the proving entity (P) from the values t, $r_{j-1}$ and the values of the tables $A^{(j)}$, $B^{(j)}$, and
- the proving entity (P) increments the tables $A^{(j+1)}$, $B^{(j+1)}$ for the iteration j+1 by replacing their values by all the possible values $\tilde{a}(r_1, \ldots r_{j-1}, x_j, \ldots x_d)$ and $\tilde{b}(r_1, \ldots r_{j-1}, x_j, \ldots x_d)$ for $(x_j, \ldots x_d) \in \{0,1\}^{d-j}$, the tables being initialised for the polynomial p2 by comprising all the possible values of the polynomials $\tilde{a}$, $\tilde{b}$ on the set $\{0,1\}^d$.

11. The method as claimed in claim 2, comprising verification of the result of calculation of a scalar product between a biometric candidate datum and each of a number m of biometric reference data, in which the biometric reference data are combined into a matrix M of size (n,m) such that the scalar products are obtained by the product of the candidate vector and of the matrix, and the Sumcheck protocol is executed on a polynomial $p_{(r1, \ldots, rd)}(j_1, \ldots, j_d)$ such that:

$$p_{(r_1, \ldots, r_d)}(j_1, \ldots, j_d) = \sum_{j_1, \ldots, j_d \in \{0,1\}^d} \tilde{a}(j_1, \ldots, j_d) \cdot M(j_1, \ldots, j_d, r_1, \ldots, r_d)$$

where $(r_1, \ldots, r_d)$ is a vector whereof the components are generated randomly by the verification entity (V).

12. The method of claim 1, wherein:
the biometric candidate datum (a) is a biometric datum acquired on a biometric trait of an individual.

13. The method claimed in claim 12, in which the proving entity (P) is an electronic device personal to the individual of telephone type, personal computer or digital tablet comprising a computer, a image sensor, and a module for acquisition of a biometric reference datum contained in an identity document.

* * * * *